US012587324B2

(12) United States Patent
Takeda et al.

(10) Patent No.: US 12,587,324 B2
(45) Date of Patent: Mar. 24, 2026

(54) TECHNIQUES FOR TRANSMITTING CHANNEL STATE INFORMATION FEEDBACK FOR A MULTI-CELL DOWNLINK CONTROL INFORMATION

(71) Applicant: QUALCOMM Incorporated, San Diego, CA (US)

(72) Inventors: Kazuki Takeda, Tokyo (JP); Peter Gaal, San Diego, CA (US); Mostafa Khoshnevisan, San Diego, CA (US); Wanshi Chen, San Diego, CA (US); Jae Ho Ryu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 897 days.

(21) Appl. No.: 17/885,247

(22) Filed: Aug. 10, 2022

(65) Prior Publication Data

US 2024/0056246 A1 Feb. 15, 2024

(51) Int. Cl.
H04L 5/00 (2006.01)

(52) U.S. Cl.
CPC .......... H04L 5/0035 (2013.01); H04L 5/0048 (2013.01); H04L 5/0057 (2013.01); H04L 5/0064 (2013.01)

(58) Field of Classification Search
CPC ... H04L 5/0035; H04L 5/0048; H04L 5/0057; H04L 5/0064
USPC .......................................................... 370/329
See application file for complete search history.

(56) References Cited

U.S. PATENT DOCUMENTS

| | | | |
|---|---|---|---|
| 2019/0268059 A1* | 8/2019 | Yang | H04L 1/1812 |
| 2020/0107299 A1* | 4/2020 | Zhou | H04W 72/0446 |
| 2020/0305133 A1* | 9/2020 | Zhou | H04W 76/27 |

FOREIGN PATENT DOCUMENTS

| | | |
|---|---|---|
| EP | 2214341 A2 | 8/2010 |
| WO | WO-2022066599 A1 | 3/2022 |

OTHER PUBLICATIONS

CATT: "Remaining Issues on CSI Reporting", 3GPP TSG RAN WG1 Meeting #92bis, R1-1803743, 3rd Generation Partnership Project, Mobile Competence Centre, 650, Route Des Lucioles, F-06921, Sophia-Antipolis Cedex, France, vol. RAN WG1, No. Sanya, China, Apr. 16, 2018-Apr. 20, 2018, Apr. 15, 2018, 4 Pages, XP051426038, The Whole Document.
International Search Report and Written Opinion—PCT/US2023/070157—ISA/EPO—Oct. 25, 2023.
(Continued)

*Primary Examiner* — Christopher R Crompton
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, from a network node, a multi-cell downlink control information (MC-DCI) that indicates scheduling information for scheduling channels on multiple component carriers (CCs). The UE may transmit, to the network node, channel state information (CSI) feedback for a set of cells scheduled by the MC-DCI based at least in part on a radio resource control (RRC) configuration. Numerous other aspects are described.

26 Claims, 12 Drawing Sheets

900 ➙

(56) References Cited

OTHER PUBLICATIONS

Moderator (Lenovo): "Feature Lead Summary #3 on Multi-cell PUSCH/POSCH Scheduling with a Single DCI", 3GPP TSG RAN WG1 Meeting #110, R1-2207771, 3rd Generation Partnership Project, Mobile Competence Centre, 650, Route Des Lucioles, F-06921, Sophia-Antipolis Cedex, France, vol. RAN WG1, No. Toulouse, France, Aug. 22, 2022-Aug. 26, 2022, Aug. 28, 2022, pp. 1-111, XP052275695, The Whole Document.

* cited by examiner

Network Node

UE

502: MC-DCI

504: RRC configuration that configures UE to report CSI feedback

506: CSI feedback based at least in part on RRC configuration

500

604

600

602

700

Receive, from a network node, a multi-cell downlink control information (MC-DCI) that indicates scheduling information for scheduling channels on multiple component carriers (CCs)

910

Transmit, to the network node, channel state information (CSI) feedback for a set of cells scheduled by the MC-DCI based at least in part on a radio resource control (RRC) configuration

920

900

1010 Transmit, to a user equipment (UE), an MC-DCI that indicates scheduling information for scheduling channels on multiple CCs 1020 Receive, from the UE, CSI feedback for a set of cells scheduled by the MC-DCI based at least in part on an RRC configuration

1000

TECHNIQUES FOR TRANSMITTING CHANNEL STATE INFORMATION FEEDBACK FOR A MULTI-CELL DOWNLINK CONTROL INFORMATION

FIELD OF THE DISCLOSURE

Aspects of the present disclosure generally relate to wireless communication and to techniques and apparatuses for transmitting channel state information (CSI) feedback for a multi-cell downlink control information (MC-DCI).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

In some implementations, a method of wireless communication performed by a user equipment (UE) includes receiving, from a network node, a multi-cell downlink control information (MC-DCI) that indicates scheduling information for scheduling channels on multiple component carriers (CCs); and transmitting, to the network node, channel state information (CSI) feedback for a set of cells scheduled by the MC-DCI based at least in part on a radio resource control (RRC) configuration.

In some implementations, a method of wireless communication performed by a network node includes transmitting, to a UE, an MC-DCI that indicates scheduling information for scheduling channels on multiple CCs; and receiving, from the UE, CSI feedback for a set of cells scheduled by the MC-DCI based at least in part on an RRC configuration.

In some implementations, an apparatus for wireless communication at a UE includes a memory and one or more processors, coupled to the memory, configured to: receive, from a network node, an MC-DCI that indicates scheduling information for scheduling channels on multiple CCs; and transmit, to the network node, CSI feedback for a set of cells scheduled by the MC-DCI based at least in part on an RRC configuration.

In some implementations, an apparatus for wireless communication at a network node includes a memory and one or more processors, coupled to the memory, configured to: transmit, to a UE, an MC-DCI that indicates scheduling information for scheduling channels on multiple CCs; and receive, from the UE, CSI feedback for a set of cells scheduled by the MC-DCI based at least in part on an RRC configuration.

In some implementations, a non-transitory computer-readable medium storing a set of instructions for wireless communication includes one or more instructions that, when executed by one or more processors of a UE, cause the UE to: receive, from a network node, an MC-DCI that indicates scheduling information for scheduling channels on multiple CCs; and transmit, to the network node, CSI feedback for a set of cells scheduled by the MC-DCI based at least in part on an RRC configuration.

In some implementations, a non-transitory computer-readable medium storing a set of instructions for wireless communication includes one or more instructions that, when executed by one or more processors of a network node, cause the network node to: transmit, to a UE, an MC-DCI that indicates scheduling information for scheduling channels on multiple CCs; and receive, from the UE, CSI feedback for a set of cells scheduled by the MC-DCI based at least in part on an RRC configuration.

In some implementations, an apparatus for wireless communication includes means for receiving, from a network node, an MC-DCI that indicates scheduling information for scheduling channels on multiple CCs; and means for transmitting, to the network node, CSI feedback for a set of cells scheduled by the MC-DCI based at least in part on an RRC configuration.

In some implementations, an apparatus for wireless communication includes means for transmitting, to a UE, an MC-DCI that indicates scheduling information for scheduling channels on multiple CCs; and means for receiving, from the UE, CSI feedback for a set of cells scheduled by the MC-DCI based at least in part on an RRC configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
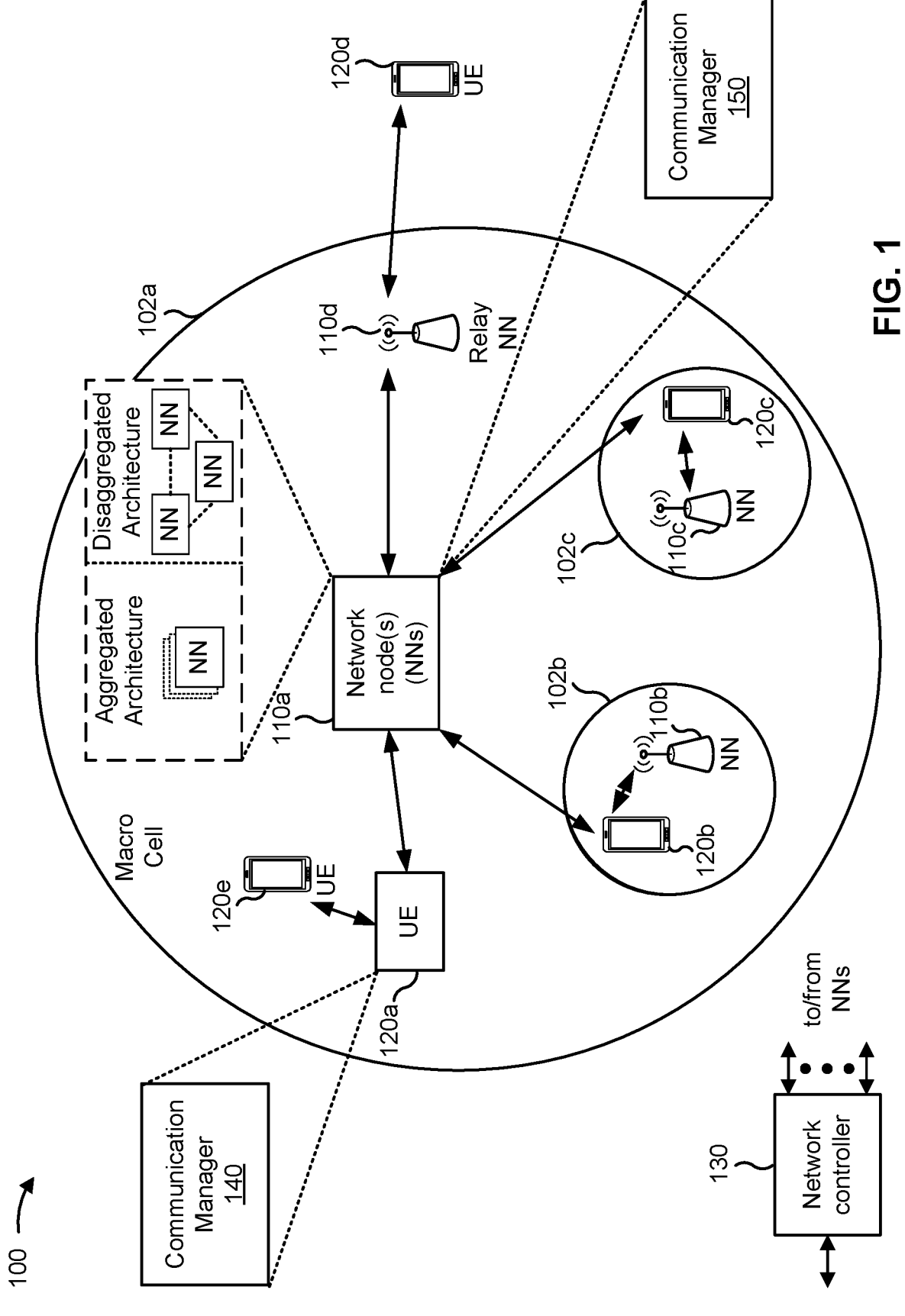
FIG. 1 is a diagram illustrating an example of a wireless network, in accordance with the present disclosure.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network node, a multi-cell downlink control information (MC-DCI) that indicates scheduling information for scheduling channels on multiple component carriers (CCs); and transmit, to the network node, channel state information (CSI) feedback for a set of cells scheduled by the MC-DCI based at least in part on a radio resource control (RRC) configuration. Additionally, or alternatively, the communication manager 140 may perform one or more other operations described herein.

In some aspects, a network node (e.g., network node 110) may include a communication manager 150. As described in more detail elsewhere herein, the communication manager 150 may transmit, to a UE, an MC-DCI that indicates scheduling information for scheduling channels on multiple CCs; and receive, from the UE, CSI feedback for a set of cells scheduled by the MC-DCI based at least in part on an RRC configuration. Additionally, or alternatively, the communication manager 150 may perform one or more other operations described herein.

As indicated above, FIG. 1 is provided as an example. Other examples may differ from what is described with regard to FIG. 1.

Figure 2:
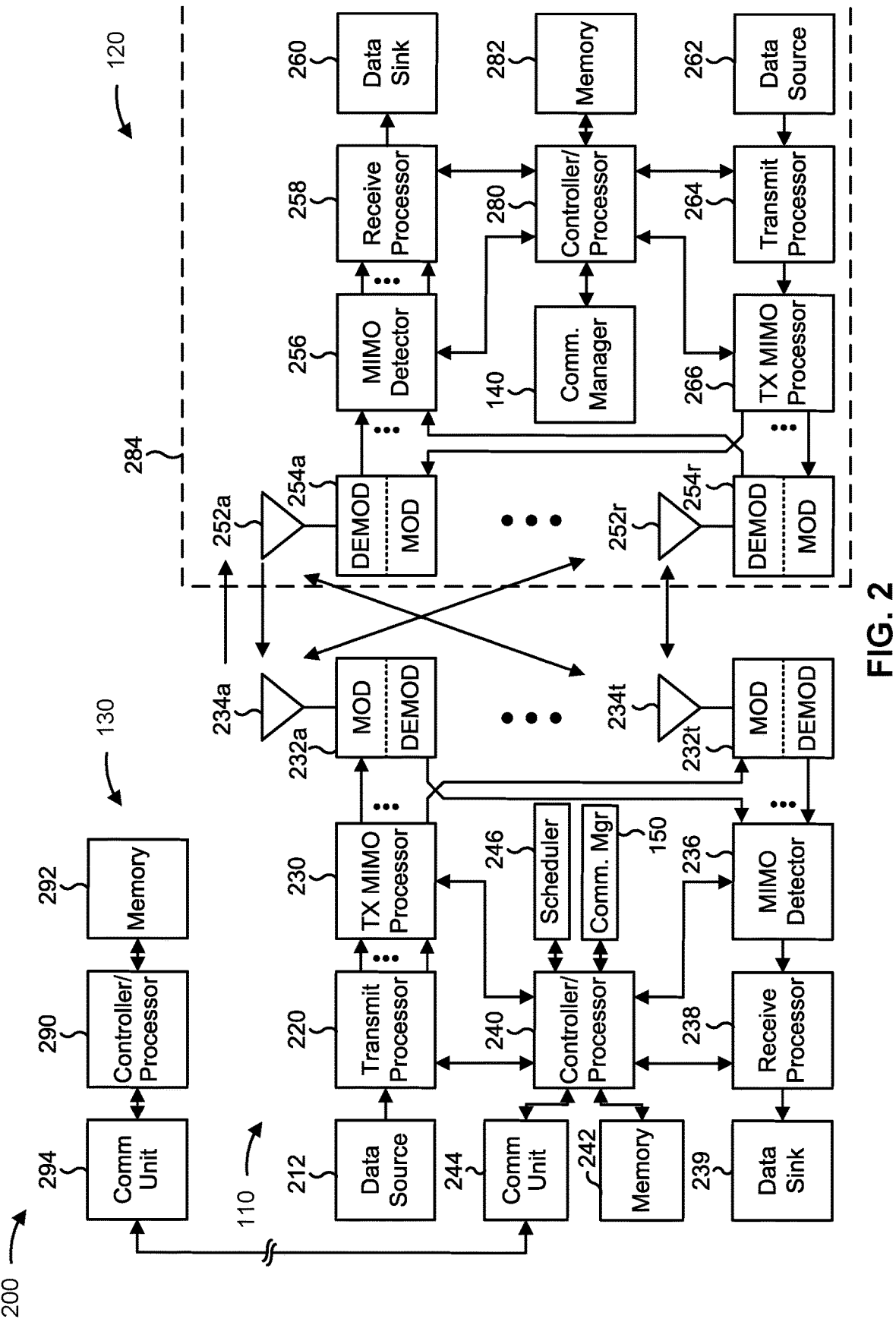
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX)

multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 5-12).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 5-12).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with transmitting CSI feedback for an MC-DCI, as described in more detail elsewhere herein. For example, the controller/processor 240 of the network node 110, the controller/processor 280 of the UE 120, or any other component(s) (or combinations of components) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving, from a network node, an MC-DCI that indicates scheduling information for scheduling channels on multiple CCs; and/or means for transmitting, to the network node, CSI feedback for a set of cells scheduled by the MC-DCI based at least in part on an RRC configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting, to a UE, an MC-DCI that indicates scheduling information for scheduling channels on multiple CCs; and/or means for receiving, from the UE, CSI feedback for a set of cells scheduled by the MC-DCI based at least in part on an RRC configuration. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base-station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
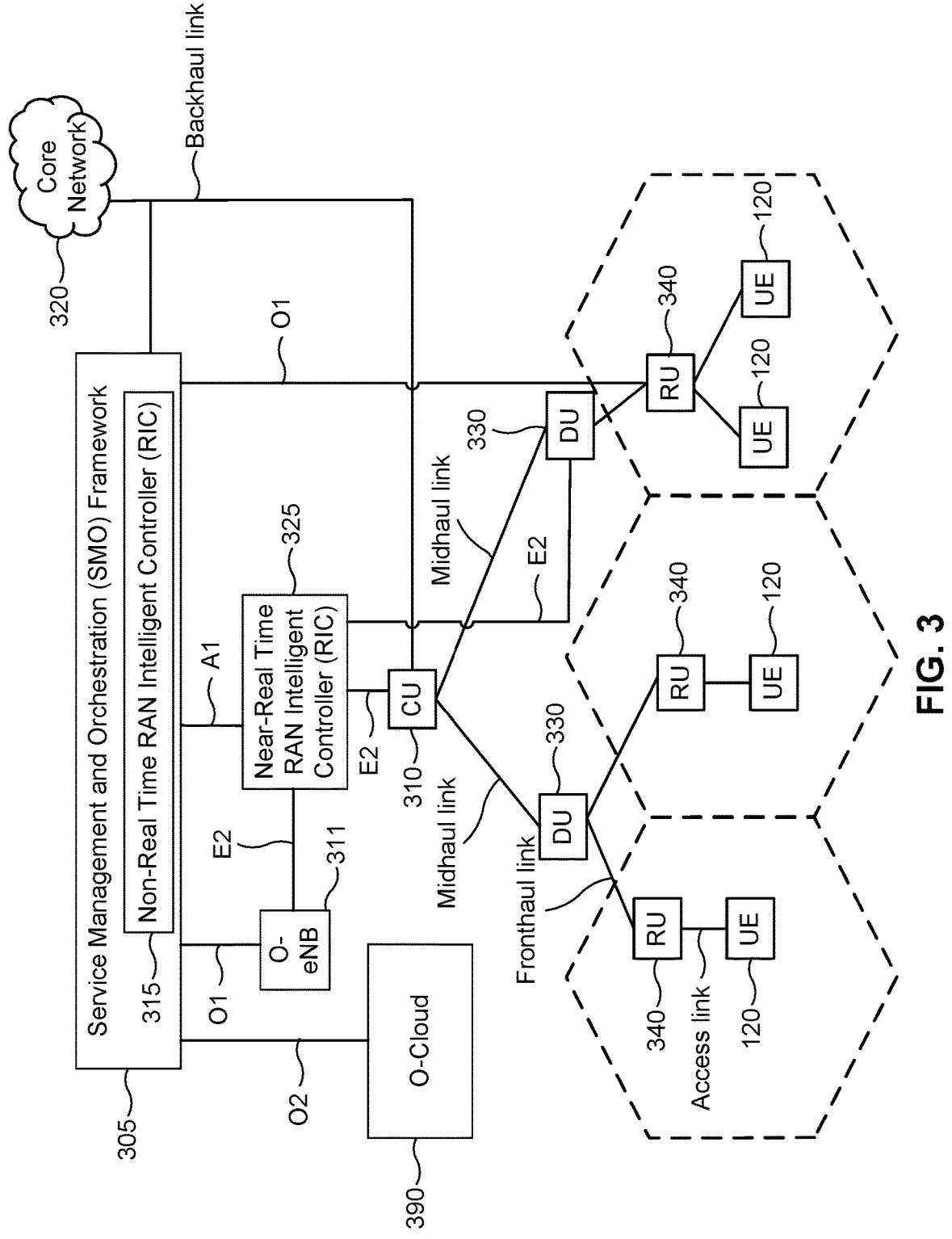
FIG. 3 is a diagram illustrating an example of a disaggregated base station architecture, in accordance with the present disclosure.

FIG. 3 is a diagram illustrating an example of a disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT MC 325 and may be received at the SMO Framework 305 or the Non-RT RIC 315 from non-network data sources or from network functions. In some examples, the Non-RT MC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

A multi-cell physical uplink shared channel (PUSCH) or physical downlink shared channel (PDSCH) scheduling may be achieved using a single downlink control information (DCI). The multi-cell PUSCH/PDSCH scheduling may be associated with one PDSCH/PUSCH per cell and may be associated with the single DCI. The multi-cell PUSCH/PDSCH scheduling may be subjected to a maximum number of cells that are allowed to be scheduled simultaneously. The multi-cell PUSCH/PDSCH scheduling may be applicable for both intra-band and inter-band carrier aggregation operations. The multi-cell PUSCH/PDSCH scheduling may be applicable for both FR1 and FR2. The single DCI may be optimized for three or more cells for the multi-cell PUSCH/PDSCH scheduling. The multi-cell PUSCH/PDSCH scheduling may be associated with co-scheduled component carriers (CCs) having different bandwidths (e.g., 5 MHz and 10 MHz) or same bandwidths (e.g., 100 MHz).

In NR, a channel state information (CSI) measurement and CSI report may be configured per cell/carrier. For a given carrier, a UE may report a channel state information reference signal (CSI-RS) resource indicator (CRI), a rank indicator (RI), a precoding matrix indication (PMI), a channel quality indicator (CQI), and/or a layer indicator (LI) with various dependencies. The CRI may be selected without restriction. The RI may be selected based at least in part on the selected CRI. The PMI may be selected based at least in part on the selected RI. The CQI may be selected based at least in part on the selected PMI. The LI may be selected based at least in part on the selected CQI. CSI dependencies may define the RI to be dependent on the CRI, the PMI to be dependent on the RI, the CQI to be dependent on the PMI, and the LI to be dependent on the CQI. For example, a PMI for rank 2 may not be reported when the UE reports RI=4 together with the PMI.

CSI reports for CSI measurements (e.g., CSI-RS measurements) of different cells/carriers may be time division multiplexed on the same uplink channel, or a CSI report for CSI measurements of different cells/carriers may be multiplexed on the same uplink channel. When multiplexed on the same uplink channel, CSI measurements may be independent from each other. For example, the uplink channel may include a CSI report for a first CC, a CSI report for a second CC, and so on. Depending on the CSI report of each cell/carrier, a network may determine a transmission rank, antenna port(s), and MCS index for each scheduled data.

Figure 4:
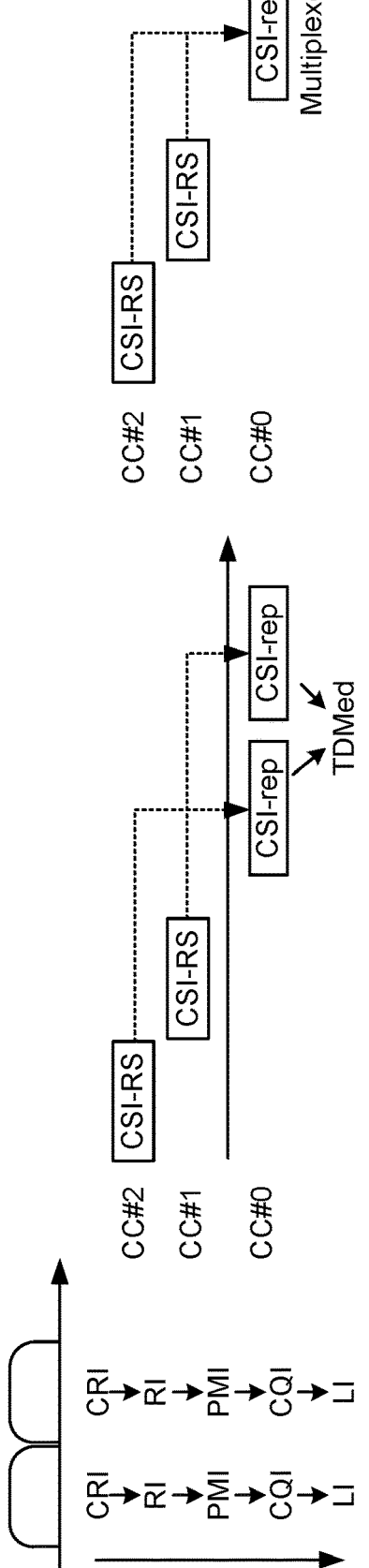
FIG. 4 is a diagram illustrating an example of channel state information (CSI) reports configured per cell or carrier, in accordance with the present disclosure.

FIG. 4 is a diagram illustrating an example 400 of CSI reports configured per cell or carrier, in accordance with the present disclosure.

As shown in FIG. 4, according to a CSI dependency, an RI may be dependent on a CRI, a PMI may be dependent on the RI, a CQI may be dependent on the PMI, and an LI may be dependent on the CQI. CSI reports for CSI measurements of different cells/carriers (e.g., CC #2, CC #1, and CC #0) may be time division multiplexed. Alternatively, a CSI report for CSI measurements of different cells/carriers (e.g., CC #2, CC #1, and CC #0) may be multiplexed.

As indicated above, FIG. 4 is provided as an example. Other examples may differ from what is described with regard to FIG. 4.

For a multi-cell scheduling, a DCI that schedules PDSCHs/PUSCHs on multiple cells/carriers, which may be referred to herein as a multi-cell DCI (MC-DCI), may need to carry scheduling information for all of the scheduled PDSCHs. CSI feedback for the cells/carriers may be based at least in part on the MC-DCI. When indication fields associated with a transmission rank, antenna port(s), and MCS index are per cell/carrier, the MC-DCI may need to carry these indication fields for each cell/carrier. The MC-DCI may carry information associated with the transmission rank, the antenna port(s), and the MCS index of the scheduled data on multiple cells/carriers, which would significantly increase a DCI overhead. The DCI overhead may be reduced by defining these indication fields as common indication fields for multiple co-scheduled cells by the MC-DCI. For example, a field may indicate a value for multiple co-scheduled cells/carriers by the MC-DCI. In other words, to compress a size associated with the MC-DCI, a common indication of the transmission rank, the antenna port(s), and the MCS index may be used.

A legacy per-cell CSI measurement/report framework may not be suitable to support a common indication of transmission rank, antenna port(s), and MCS for multiple co-scheduled cells. For example, a UE may report RI=2 for CC1 with a PMI selected from a set of PMIs specified for rank 2, and the UE may report RI=4 for CC2 with a PMI selected from a set of PMIs specified for rank 4. Further, the UE may report a CQI based at least in part on the selected {RI, PMI} for CC1 and a CQI based at least in part on the selected {RI, PMI} for CC2, respectively. In this example, a network may identify an appropriate precoder for rank 2 for CC1 and an appropriate precoder for rank 4 for CC2, but the network may be unable to identify an appropriate rank and precoder that are common for CC1 and CC2. The network may select rank 2 commonly for both CCs. However, a UE reported PMI/CQI for CC2 may be for rank 4, and hence, the network may be unable to identify an appropriate precoder and MCS in case of rank 2 for CC2.

An MC-DCI may be used to perform multi-cell PUSCH/PDSCH scheduling for a first cell associated with CC1 and a second cell associated with CC2. With the MC-DCI, the network may be unable to determine a common rank for the co-scheduled CCs (e.g., CC1 and CC2). The network may select a conservative rank (e.g., rank 2) for the co-scheduled CCs, but the network may be unable to determine appropriate precoder(s)/MCS for the co-scheduled CCs. As an example, CC1 may be associated with RI=2, PMI=x1, and CQI=y1, and CC2 may be associated with RI=4, PMI=x2, and CQI=y2. In this example, the UE may not report the PMI/CQI for RI=2.

In various aspects of techniques and apparatuses described herein, a UE may receive, from a network node, an MC-DCI that indicates scheduling information for scheduling channels on multiple CCs (or multiple cells). The multiple CCs may include a first CC and a second CC. The channels may include PDSCHs/PUSCHs. The UE may receive, from the network node, an RRC configuration for reporting CSI feedback. The UE may transmit, to the network node, the CSI feedback for a set of cells scheduled by the MC-DCI based at least in part on the RRC configuration. In some aspects, the RRC configuration may configure the UE to report a first RI, a first PMI, a first CQI, a second PMI, and a second CQI for the first CC, where the second PMI and the second CQI may be based at least in part on a second RI selected for the second CC. In some aspects, the RRC configuration may configure the UE to report multiple RIs, PMIs, and CQIs with different RIs for each CC of the multiple CCs. In some aspects, the RRC configuration may configure the UE to multiplex multiple sets of CSI reports for each CC of the multiple CCs on an uplink channel. In some aspects, the RRC configuration may configure the UE to report a same RI for the multiple CCs. As a result, the UE may be able to report the CSI feedback for multiple co-scheduled cells associated with the MC-DCI. The network node may use the CSI feedback to determine a common rank for co-scheduled CCs. The network node may use the CSI feedback to determine appropriate precoder(s) and/or MCS values (e.g., common precoders and/or MCS values) for the co-scheduled CCs.

Figure 5:
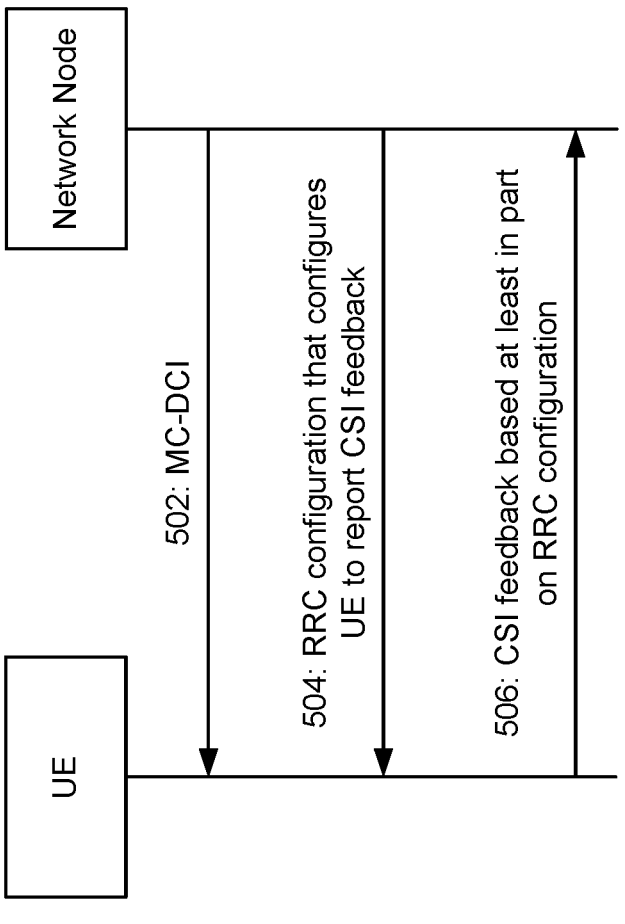
FIGS. 5-8 are diagrams illustrating examples associated with transmitting CSI feedback for a multi-cell downlink control information (MC-DCI), in accordance with the present disclosure.

FIG. 5 is a diagram illustrating an example 500 associated with transmitting CSI feedback for an MC-DCI, in accordance with the present disclosure. As shown in FIG. 5, example 500 includes communication between a UE (e.g., UE 120) and a network node (e.g., network node 110). In some aspects, the UE and the network node may be included in a wireless network, such as wireless network 100.

As shown by reference number 502, the UE may receive, from the network node, an MC-DCI that indicates scheduling information for scheduling channels on multiple CCs. The channels that are scheduled by the MC-DCI may be PDSCHs/PUSCHs. The MC-DCI may be associated with a DCI format 1_X for downlink or a DCI format 0_X for uplink. The multiple CCs may include a first CC and a second CC, and the MC-DCI may indicate scheduling information for the first CC and the second CC. The MC-DCI may provide a common indication of a transmission rank, antenna port(s), and/or an MCS, which may compress a size associated with the MC-DCI. In other words, the transmission rank, the antenna port(s), and/or the MCS may be associated with common indication fields for multiple co-scheduled cells by the MC-DCI.

As shown by reference number 504, the UE may receive, from the network node, an RRC configuration. The RRC configuration may be associated with a new mode or configuration for reporting CSI feedback. For a set of cells configured to be scheduled by the MC-DCI, the UE may perform a specific manner of CSI feedback for the set of cells configured to be scheduled by the MC-DCI, where the specific manner of CSI feedback may be based at least in part on the RRC configuration. In a first option, the RRC configuration may configure the UE to report a first RI, a first PMI, a first CQI, a second PMI, and a second CQI for the first CC, where the second PMI and the second CQI may be based at least in part on a second RI selected for the second CC. In a second option, the RRC configuration may configure the UE to report multiple RIs, PMIs, and CQIs with different RIs for each CC of the multiple CCs. In the first option and the second option, the RRC configuration may configure the UE to multiplex (or time division multiplex) multiple sets of CSI reports for each CC of the multiple CCs on an uplink channel. In a third option, the RRC configuration may configure the UE to report a same RI for the multiple CCs.

As shown by reference number 506, the UE may transmit, to the network node, the CSI feedback for the set of cells scheduled by the MC-DCI based at least in part on the RRC configuration. The CSI feedback may indicate one or more RIs, one or more PMIs, one or more CQIs, and one or more LIs for the multiple CCs scheduled by the MC-DCI. The network node may receive the CSI feedback from the UE. The network node may select an appropriate rank, precoder, and/or MCS value for co-scheduled CCs based at least in part on the CSI feedback.

In some aspects, in accordance with the first option, when transmitting the CSI feedback, the UE may transmit a first RI for the first CC, a second RI for the second CC, one or more of a PMI or a CQI associated with the first RI for the first CC, a PMI and a CQI associated with the second RI for the first CC, a PMI and a CQI associated with the second RI for the second CC, and a PMI and a CQI associated with the first RI for the second CC. In some aspects, in accordance with the second option, when transmitting the CSI feedback, the UE may transmit a first RI for the first CC, one or more of a PMI, a CQI, or an LI associated with the first RI, a second RI for the first CC, a PMI, a CQI, and an LI associated with the second RI, a third RI for the second CC, a PMI, a CQI, and an LI associated with the third RI, a fourth RI for the second CC, and a PMI, a CQI, and an LI associated with the fourth RI. In some aspects, in accordance with the third option, when transmitting the CSI feedback, the UE may transmit one or more of: a same RI for the first CC and the second CC, a same or different PMI for the first CC and the second CC, a same or different CQI for the first CC and the second CC, and a same or different LI for the first CC and the second CC.

In some aspects, the UE may be configured via RRC signaling with the first option (e.g., the UE reports {PMI, CQI} associated with each RI for each CC), the second option (e.g., the UE reports multiple RI values for each CC, and the UE reports as associated PMI/CQI/LI for each RI value), and/or the third option (e.g., the UE selects a common RI for co-scheduled CCs).

In some aspects, for the first option, the UE may report {RI, PMI, CQI} and {PMI, CQI} for a CC, where the {PMI, CQI} may be based at least in part on a selected RI for another CC. For the second option, the UE may report multiple {RI, PMI, CQI} with different RI values for each CC. For the first option and the second option, the multiple sets of reports for each CC may be time division multiplexed or multiplexed on the same uplink channel.

In some aspects, for the third option, the UE may report the same RI for multiple CCs, where the multiple CCs may be scheduled by the same MC-DCI. In an explicit configuration, an RRC parameter may configure the UE to report the same RI for a CSI report of multiple CCs. In an implicit configuration, when the UE is configured to monitor the MC-DCI for multiple co-scheduled CCs, the UE may report the same RI for multiple CCs that are scheduled by the same MC-DCI without an explicit configuration.

In some aspects, among the multiple {RI, PMI, CQI} with different RI values for each CC of the co-scheduled CCs, the UE may select the same RI value for at least one {RI, PMI, CQI} for the co-scheduled CCs. For example, the UE may report two sets of {RI, PMI, CQI} for each CC. In this case, the UE may select (e.g., the UE may be required to select) one common RI value for the multiple CCs, and the UE may report the selection as a set of {RI, PMI, CQI} for CCs. The UE may not perform such an action for the other set of {RI, PMI, CQI} for CCs.

In some aspects, the UE may transmit the CSI feedback based at least in part on CSI-RS resources on the multiple CCs, or a CSI reporting type for the multiple CCs being aligned. In some aspects, the UE may transmit the CSI feedback based at least in part on a same CSI report configuration type, a same report quantity, a same time restriction, or a same codebook configuration for the multiple CCs. In some aspects, the MC-DCI may be one of multiple MC-DCIs, where each MC-DCI of the multiple MC-DCIs may be for scheduling downlink shared channels with a particular rank for co-scheduled CCs. The MC-DCIs may have different fields or different bit-widths of a field based at least in part on the MC-DCIs being for different ranks.

In some aspects, a UE may monitor the multiple MC-DCIs, where each MC-DCI may be for scheduling PDSCHs with a particular rank for the co-scheduled CCs. For example, the UE may monitor MC-DCI-1 for a set of co-scheduled CCs for PDSCHs with the common rank 1, the UE may monitor MC-DCI-2 for the same set of co-scheduled CCs for PDSCHs with the common rank 2, and so on. The MC-DCIs may have different fields or different bit-widths of a field (since they are for different ranks), and the total size of MC-DCIs may be the same or different. As a result, a scheduling flexibility may be improved. Although the bit-width of a field indicating transmission rank/antenna port(s) in each MC-DCI may be limited, different MC-DCIs for different ranks may effectively increase the number of rank/antenna port(s) indications by selecting one of the multiple MC-DCIs for the same set of co-scheduled CCs.

As indicated above, FIG. 5 is provided as an example. Other examples may differ from what is described with regard to FIG. 5.

Figure 6:
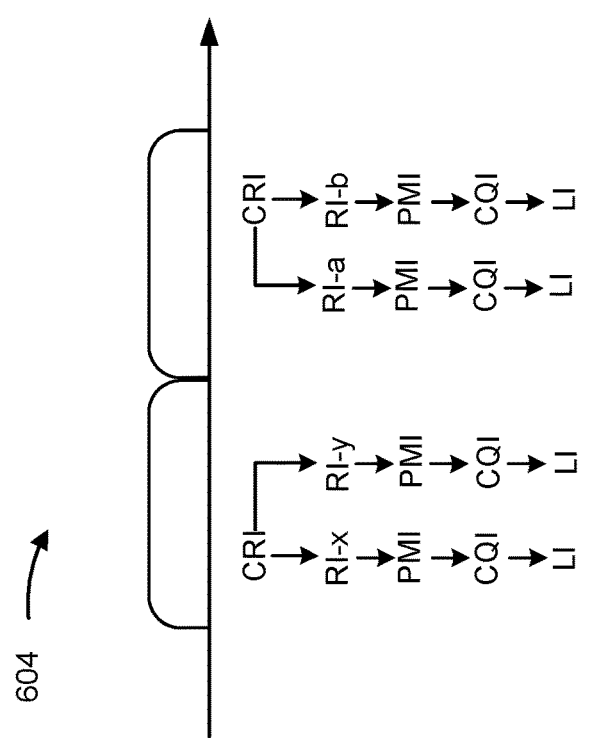
Figure 6:
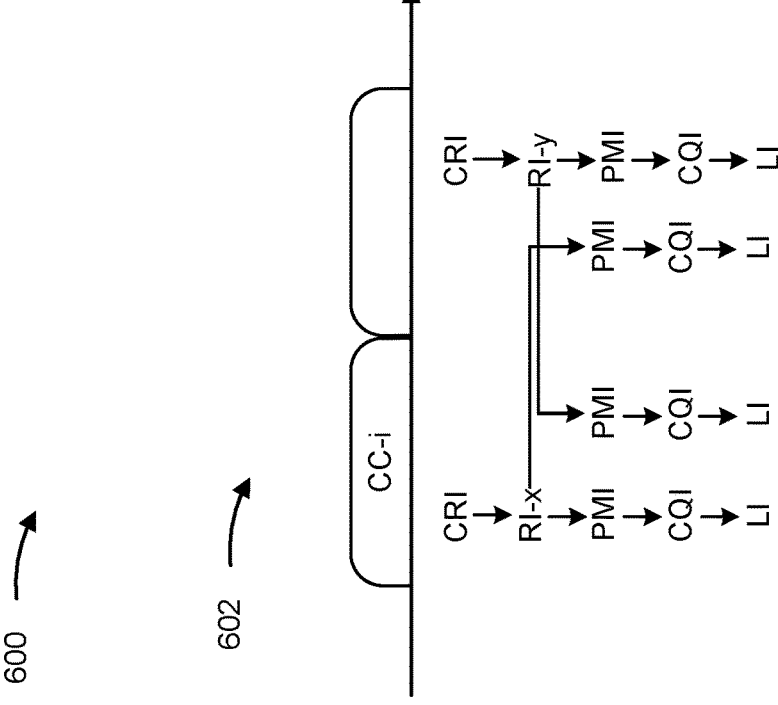

FIG. 6 is a diagram illustrating an example 600 associated with transmitting CSI feedback for an MC-DCI, in accordance with the present disclosure.

As shown by reference number 602, when transmitting CSI feedback, in a first option, a UE may report RI-x for CC-i and RI-y for CC-j, where CC-i and CC-j may be co-scheduled by a network entity using an MC-DCI. CC-i and CC-j may refer to a first CC and a second CC, respectively. When the UE reports RI-x for CC-i and RI-y for CC-j, where CC-i and CC-j may be co-scheduled by the MC-DCI, the UE may report a PMI and a CQI (e.g., {PMI, CQI}) associated with each of RI-x and RI-y for each of CC-i and CC-j. For example, for CC-i, the UE may report the PMI and the CQI associated with RI-x, and the UE may report the PMI and the CQI associated with RI-y. For CC-j, the UE may report the PMI and the CQI associated with RI-y, and the UE may report the PMI and the CQI associated with RI-x.

As shown by reference number 604, when transmitting CSI feedback, in a second option, for each of CC-i and CC-j, a UE may report multiple RI values and an associated PMUCQI/LI for each RI value, which may result in a higher probability of a common RI across CCs. For example, for CC-i, the UE may report RI-x and RI-y. The UE may report a PMUCQI/LI associated with RI-x. The UE may report a PMUCQI/LI associated with RI-y. For CC-j, the UE may report RI-a and RI-b. The UE may report a PMUCQI/LI associated with RI-a. The UE may report a PMUCQI/LI associated with RI-b.

As indicated above, FIG. 6 is provided as an example. Other examples may differ from what is described with regard to FIG. 6.

Figure 7:
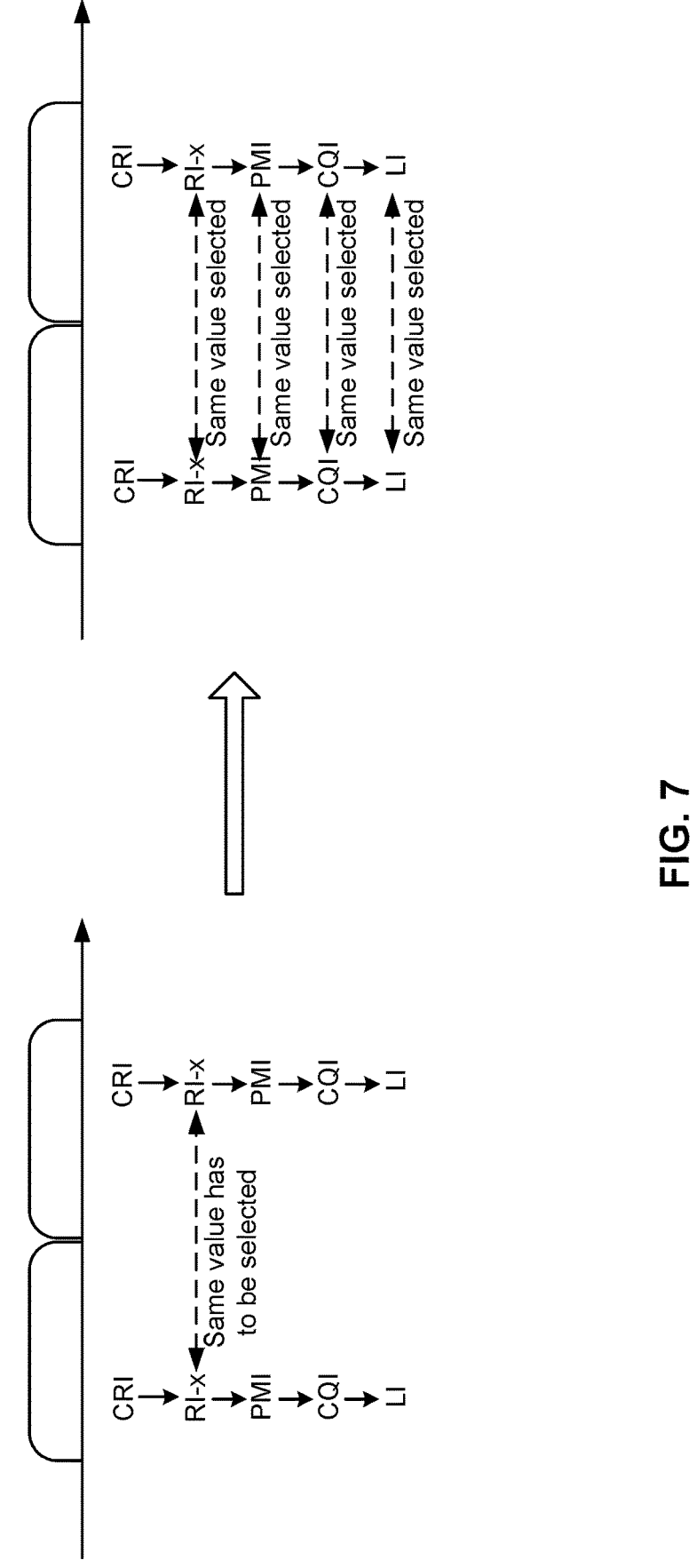

FIG. 7 is a diagram illustrating an example 700 associated with transmitting CSI feedback for an MC-DCI, in accordance with the present disclosure.

As shown in FIG. 7, when transmitting CSI feedback, in a third option, a UE may report a common RI for co-scheduled CCs. The UE may select the common RI for the co-scheduled CCs in CSI reports under certain conditions. A PMUCQI/LI may be common/aligned for co-scheduled CCs. Independent PMIs/CQIs/LIs or common PMUCQI/LI may be configured via RRC signaling. The PMI, CQI, and/or LI may be separately configured to be independent or common with respect to other PMIs/CQIs/LIs.

For example, for CC-i, the UE may report RI-x. The UE may report a PMUCQI/LI associated with RI-x. For CC-j, the UE may also report RI-x. For CC-j, the UE may also report the PMUCQI/LI associated with RI-x. The PMI associated with CC-i may be the same as the PMI associated with CC-j. The CQI associated with CC-i may be the same as the CQI associated with CC-j. The LI associated with CC-i may be the same as the LI associated with CC-j.

As indicated above, FIG. 7 is provided as an example. Other examples may differ from what is described with regard to FIG. 7.

In some aspects, a CSI resource/report may be defined according to a configuration. The configuration may indicate a report configuration type (e.g., periodic, semi-persistent, or aperiodic) and a reporting periodicity/offset/timing, a report quantity (e.g., cri-RI-PMI-CQI, cri-RI-i1, cri-RI-i1-CQI, cri-RI-CQI, and cri-RI-LI-PMI-CQI), a wideband or sub-band parameter, a time restriction (e.g., whether the report is based at least in part on a latest CSI-RS), a CQI-Table (e.g., one of multiple CQI-tables may be used for a CQI report), a codebook configuration (e.g., type, codebook subset restriction, and/or RI restriction), and/or a CSI physical uplink control channel (PUCCH) CSI-PUCCH resource (e.g., for a periodic or semi-persistent CSI on a PUCCH).

In some aspects, a first option (e.g., a UE reports {PMI, CQI} associated with each RI for each CC) may enable cross-CC CSI dependencies, and a third option (e.g., a UE selects a common RI for co-scheduled CCs) may enable a cross-CC CSI alignment. The first option and/or the third option may be enabled based at least in part on certain conditions. For example, the first option and/or the third option may be enabled when CSI-RS resources on CCs and/or a CSI reporting type/timing for the CCs are aligned (or within a time window). The first option and/or the third option may be enabled when a CSI report configuration type, a report quantity, a time restriction, and/or a codebook configuration for the CCs are configured to be the same.

Figure 8:
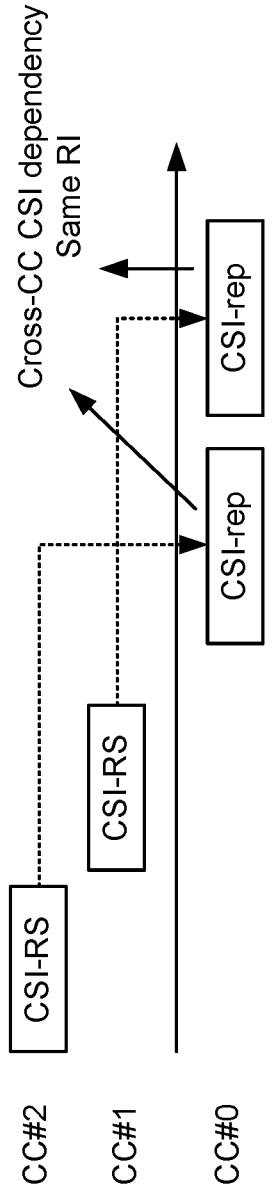

FIG. 8 is a diagram illustrating an example 800 associated with transmitting CSI feedback for an MC-DCI, in accordance with the present disclosure.

As shown in FIG. 8, CSI reports may be based at least in part on a cross-CC CSI dependency, and/or the CSI reports may be based at least in part on a same RI. The CSI reports may be associated with different CCs (e.g., CC #2 and CC #1). The cross-CC CSI dependency and/or the same RI may be based at least in part on CSI-RS resources on CCs and/or a CSI reporting type/timing for the CCs being aligned (or within a time window). The cross-CC CSI dependency and/or the same RI may be based at least in part on a CSI report configuration type, a report quantity, a time restriction, and/or a codebook configuration for the CCs being configured to be the same.

As indicated above, FIG. 8 is provided as an example. Other examples may differ from what is described with regard to FIG. 8.

Figure 9:
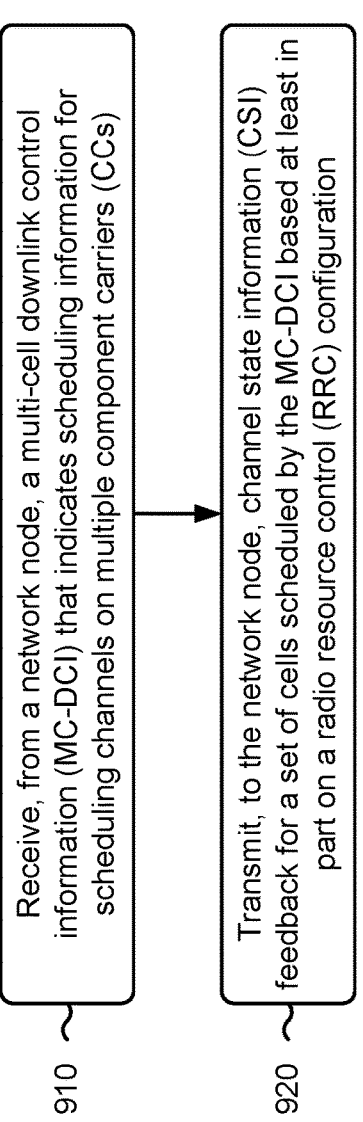
FIGS. 9-10 are diagrams illustrating example processes associated with transmitting CSI feedback for an MC-DCI, in accordance with the present disclosure.

FIG. 9 is a diagram illustrating an example process 900 performed, for example, by a UE, in accordance with the present disclosure. Example process 900 is an example where the UE (e.g., UE 120) performs operations associated with transmitting CSI feedback for an MC-DCI.

As shown in FIG. 9, in some aspects, process 900 may include receiving, from a network node, an MC-DCI that indicates scheduling information for scheduling channels on multiple CCs (block 910). For example, the UE (e.g., using reception component 1102, depicted in FIG. 11) may receive, from a network node, an MC-DCI that indicates scheduling information for scheduling channels on multiple CCs, as described above.

As further shown in FIG. 9, in some aspects, process 900 may include transmitting, to the network node, CSI feedback for a set of cells scheduled by the MC-DCI based at least in part on an RRC configuration (block 920). For example, the UE (e.g., using transmission component 1104, depicted in FIG. 11) may transmit, to the network node, CSI feedback for a set of cells scheduled by the MC-DCI based at least in part on an RRC configuration, as described above.

Process 900 may include additional aspects, such as any single aspect or any combination of aspects described below and/or in connection with one or more other processes described elsewhere herein.

In a first aspect, the MC-DCI indicates the scheduling information for a first CC and a second CC, and process 900 includes transmitting a first RI for the first CC, a second RI for the second CC, one or more of a PMI or a CQI associated with the first RI for the first CC, a PMI and a CQI associated with the second RI for the first CC, a PMI and a CQI associated with the second RI for the second CC, and a PMI and a CQI associated with the first RI for the second CC.

In a second aspect, alone or in combination with the first aspect, the MC-DCI indicates the scheduling information for a first CC and a second CC, and process 900 includes transmitting a first RI for the first CC, one or more of a PMI, a CQI, or an LI associated with the first RI, a second RI for the first CC, a PMI and a CQI and an LI associated with the second RI, a third RI for the second CC, a PMI and a CQI and an LI associated with the third RI, a fourth RI for the second CC, and a PMI and a CQI and an LI associated with the fourth RI.

In a third aspect, alone or in combination with one or more of the first and second aspects, the MC-DCI indicates the scheduling information for a first CC and a second CC, and process 900 includes transmitting one or more of: a same RI for the first CC and the second CC, a same or different PMI for the first CC and the second CC, a same or different CQI for the first CC and the second CC, and a same or different LI for the first CC and the second CC.

In a fourth aspect, alone or in combination with one or more of the first through third aspects, the RRC configuration configures the UE to report a first RI, a first PMI, a first CQI, a second PMI, and a second CQI for a first CC, wherein the second PMI and the second CQI are based at least in part on a second RI selected for a second CC.

In a fifth aspect, alone or in combination with one or more of the first through fourth aspects, the RRC configuration configures the UE to report multiple RIs, PMIs, and CQIs with different RIs for each CC of the multiple CCs.

In a sixth aspect, alone or in combination with one or more of the first through fifth aspects, the RRC configuration configures the UE to multiplex multiple sets of CSI reports for each CC of the multiple CCs on an uplink channel.

In a seventh aspect, alone or in combination with one or more of the first through sixth aspects, the RRC configuration configures the UE to report a same RI for the multiple CCs.

In an eighth aspect, alone or in combination with one or more of the first through seventh aspects, process 900 includes transmitting the CSI feedback based at least in part on one or more of CSI reference signal resources on the multiple CCs, or a CSI reporting type for the multiple CCs being aligned.

In a ninth aspect, alone or in combination with one or more of the first through eighth aspects, process 900 includes transmitting the CSI feedback based at least in part on a same CSI repot configuration type, a same report quantity, a same time restriction, or a same codebook configuration for the multiple CCs.

In a tenth aspect, alone or in combination with one or more of the first through ninth aspects, the MC-DCI is one of multiple MC-DCIs, and each MC-DCI of the multiple MC-DCIs is for scheduling downlink shared channels with a particular rank for co-scheduled CCs, and the MC-DCIs have different fields or different bit-widths of a field based at least in part on the MC-DCIs being for different ranks.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
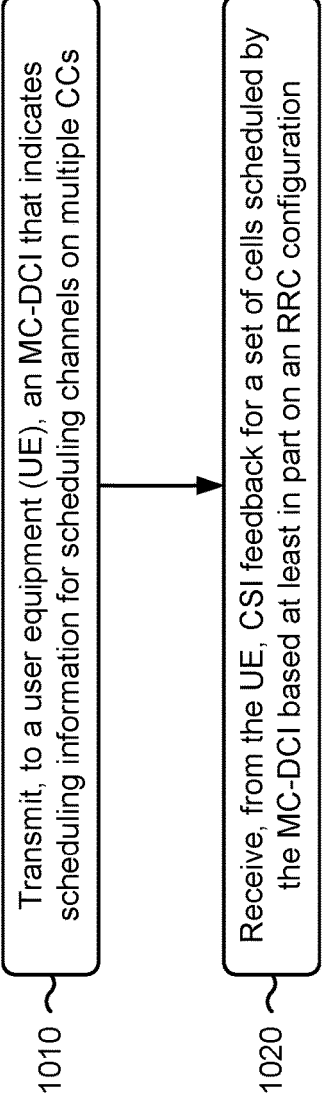

FIG. 10 is a diagram illustrating an example process 1000 performed, for example, by a network node, in accordance with the present disclosure. Example process 1000 is an example where the network node (e.g., network node 110) performs operations associated with transmitting CSI feedback for an MC-DCI.

As shown in FIG. 10, in some aspects, process 1000 may include transmitting, to a UE, an MC-DCI that indicates scheduling information for scheduling channels on multiple CCs (block 1010). For example, the network node (e.g., using transmission component 1204, depicted in FIG. 12) may transmit, to a UE, an MC-DCI that indicates scheduling information for scheduling channels on multiple CCs, as described above.

As further shown in FIG. 10, in some aspects, process 1000 may include receiving, from the UE, CSI feedback for a set of cells scheduled by the MC-DCI based at least in part on an RRC configuration (block 1020). For example, the network node (e.g., using reception component 1202, depicted in FIG. 12) may receive, from the UE, CSI feedback for a set of cells scheduled by the MC-DCI based at least in part on an RRC configuration, as described above.

Process 1000 may include additional aspects, such as any single aspect or any combination of aspects described below and/or in connection with one or more other processes described elsewhere herein.

In a first aspect, the MC-DCI indicates the scheduling information for a first CC and a second CC, and process 1000 includes receiving a first RI for the first CC, a second RI for the second CC, one or more of a PMI or a CQI associated with the first RI for the first CC, a PMI and a CQI associated with the second RI for the first CC, a PMI and a CQI associated with the second RI for the second CC, and a PMI and a CQI associated with the first RI for the second CC.

In a second aspect, alone or in combination with the first aspect, the MC-DCI indicates the scheduling information for a first CC and a second CC, and process 1000 includes receiving a first RI for the first CC, one or more of a PMI or a CQI and an LI associated with the first RI, a second RI for the first CC, a PMI and a CQI and an LI associated with the second RI, a third RI for the second CC, a PMI and a CQI and an LI associated with the third RI, a fourth RI for the second CC, and a PMI and a CQI and an LI associated with the fourth RI.

In a third aspect, alone or in combination with one or more of the first and second aspects, the MC-DCI indicates the scheduling information for a first CC and a second CC, and process 1000 includes receiving one or more of: a same RI for the first CC and the second CC, a same or different PMI for the first CC and the second CC, a same or different CQI for the first CC and the second CC, and a same or different LI for the first CC and the second CC.

In a fourth aspect, alone or in combination with one or more of the first through third aspects, the RRC configuration configures the UE to report a first RI, a first PMI, a first CQI, a second PMI, and a second CQI for a first CC, wherein the second PMI and the second CQI are based at least in part on a second RI selected for a second CC.

In a fifth aspect, alone or in combination with one or more of the first through fourth aspects, the RRC configuration configures the UE to report multiple RIs, PMIs, and CQIs with different Ms for each CC of the multiple CCs.

In a sixth aspect, alone or in combination with one or more of the first through fifth aspects, the RRC configuration configures the UE to multiplex multiple sets of CSI reports for each CC of the multiple CCs on an uplink channel.

In a seventh aspect, alone or in combination with one or more of the first through sixth aspects, the RRC configuration configures the UE to report an RI for the multiple CCs.

In an eighth aspect, alone or in combination with one or more of the first through seventh aspects, process 1000 includes receiving the CSI feedback based at least in part on one or more of CSI reference signal resources on the multiple CCs, or a CSI reporting type for the multiple CCs being aligned.

In a ninth aspect, alone or in combination with one or more of the first through eighth aspects, process 1000 includes receiving the CSI feedback based at least in part on a same CSI repot configuration type, a same report quantity, a same time restriction, or a same codebook configuration for the multiple CCs.

In a tenth aspect, alone or in combination with one or more of the first through ninth aspects, the MC-DCI is one of multiple MC-DCIs, and each MC-DCI of the multiple MC-DCIs is for scheduling downlink shared channels with a particular rank for co-scheduled CCs, and the MC-DCIs have different fields or different bit-widths of a field based at least in part on the MC-DCIs being for different ranks.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
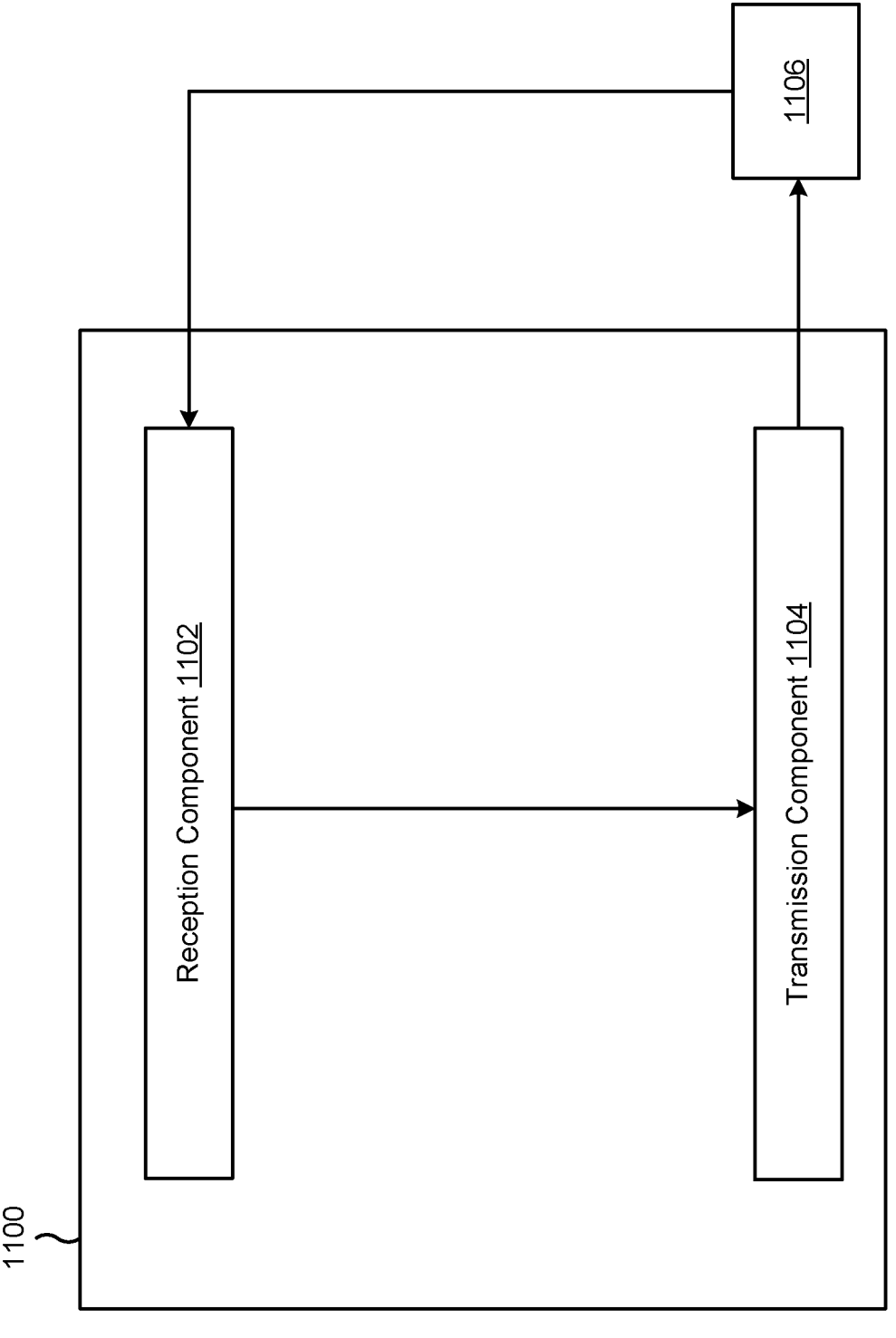
FIGS. 11-12 are diagrams of example apparatuses for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104.

In some aspects, the apparatus 1100 may be configured to perform one or more operations described herein in connection with FIGS. 5-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, from a network node, an MC-DCI that indicates scheduling information for scheduling channels on multiple CCs. The transmission component 1104 may transmit, to the network node, CSI feedback for a set of cells scheduled by the MC-DCI based at least in part on an RRC configuration.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
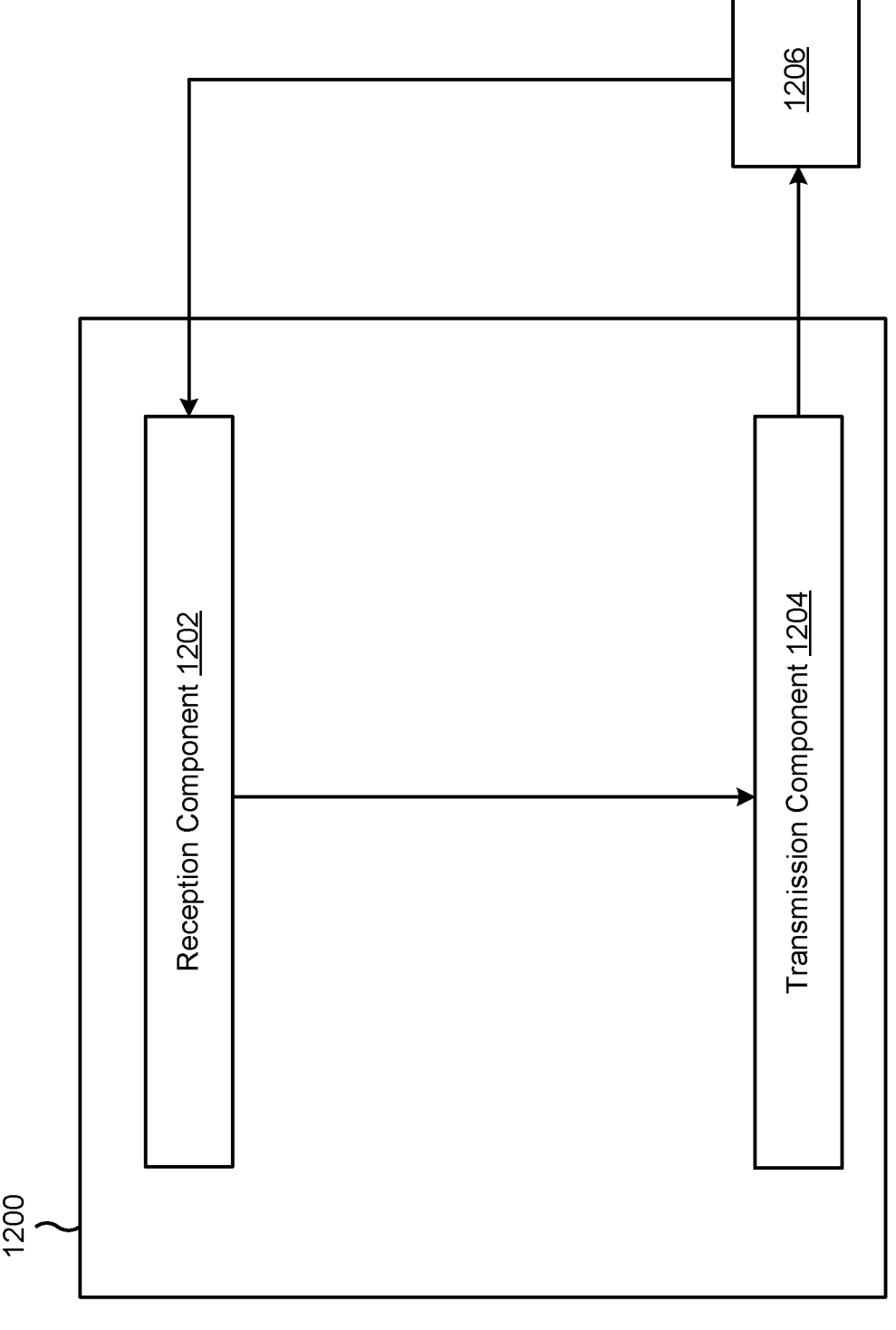

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204.

In some aspects, the apparatus 1200 may be configured to perform one or more operations described herein in connection with FIGS. 5-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The transmission component 1204 may transmit, to a UE, an MC-DCI that indicates scheduling information for scheduling channels on multiple CCs. The reception component 1202 may receive, from the UE, CSI feedback for a set of cells scheduled by the MC-DCI based at least in part on an RRC configuration.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a network node, a multi-cell downlink control information (MC-DCI) that indicates scheduling information for scheduling channels on multiple component carriers (CCs); and transmitting, to the network node, channel state information (CSI) feedback for a set of cells scheduled by the MC-DCI based at least in part on a radio resource control (RRC) configuration.

Aspect 2: The method of Aspect 1, wherein the MC-DCI indicates the scheduling information for a first CC and a second CC, and wherein transmitting a first rank indicator (RI) for the first CC, a second RI for the second CC, one or more of a precoding matrix indicator (PMI) or a channel quality indicator (CQI) associated with the first RI for the first CC, a PMI and a CQI associated with the second RI for the first CC, a PMI and a CQI associated with the second RI for the second CC, and a PMI and a CQI associated with the first RI for the second CC.

Aspect 3: The method of any of Aspects 1 through 2, wherein the MC-DCI indicates the scheduling information for a first CC and a second CC, and wherein transmitting the CSI feedback comprises: transmitting a first rank indicator (RI) for the first CC, one or more of a precoding matrix indicator (PMI), a channel quality indicator (CQI), or a layer indicator (LI) associated with the first RI, a second RI for the first CC, a PMI and a CQI and an LI associated with the second RI, a third RI for the second CC, a PMI and a CQI and an LI associated with the third RI, a fourth RI for the second CC, and a PMI and a CQI and an LI associated with the fourth RI.

Aspect 4: The method of any of Aspects 1 through 3, wherein the MC-DCI indicates the scheduling information for a first CC and a second CC, and wherein transmitting the CSI feedback comprises: transmitting one or more of: a same rank indicator (RI) for the first CC and the second CC, a same or different precoding matrix indicator (PMI) for the first CC and the second CC, a same or different channel quality indicator (CQI) for the first CC and the second CC, and a same or different layer indicator (LI) for the first CC and the second CC.

Aspect 5: The method of any of Aspects 1 through 4, wherein the RRC configuration configures the UE to report a first rank indicator (RI), a first precoding matrix indicator (PMI), a first channel quality indicator (CQI), a second PMI, and a second CQI for a first CC, wherein the second PMI and the second CQI are based at least in part on a second RI selected for a second CC.

Aspect 6: The method of any of Aspects 1 through 5, wherein the RRC configuration configures the UE to report multiple rank indicators (RIs), precoding matrix indicators (PMIs), and channel quality indicators (CQIs) with different RIs for each CC of the multiple CCs.

Aspect 7: The method of any of Aspects 1 through 6, wherein the RRC configuration configures the UE to multiplex multiple sets of CSI reports for each CC of the multiple CCs on an uplink channel.

Aspect 8: The method of any of Aspects 1 through 7, wherein the RRC configuration configures the UE to report a same rank indicator for the multiple CCs.

Aspect 9: The method of any of Aspects 1 through 8, wherein the transmission of the CSI feedback is based at least in part on one or more of: CSI reference signal resources on the multiple CCs, or a CSI reporting type for the multiple CCs being aligned.

Aspect 10: The method of any of Aspects 1 through 9, wherein the transmission of the CSI feedback is based at least in part on a same CSI repot configuration type, a same report quantity, a same time restriction, or a same codebook configuration for the multiple CCs.

Aspect 11: The method of any of Aspects 1 through 10, wherein the MC-DCI is one of multiple MC-DCIs, wherein each MC-DCI of the multiple MC-DCIs is for scheduling downlink shared channels with a particular rank for co-scheduled CCs, and wherein the MC-DCIs have different fields or different bit-widths of a field based at least in part on the MC-DCIs being for different ranks.

Aspect 12: A method of wireless communication performed by a network node, comprising: transmitting, to a user equipment (UE), a multi-cell downlink control information (MC-DCI) that indicates scheduling information for scheduling channels on multiple component carriers (CCs); and receiving, from the UE, channel state information (CSI) feedback for a set of cells scheduled by the MC-DCI based at least in part on a radio resource control (RRC) configuration.

Aspect 13: The method of Aspect 12, wherein the MC-DCI indicates the scheduling information for a first CC and a second CCs, and wherein receiving the CSI feedback comprises: a first rank indicator (RI) for the first CC, a second RI for the second CC, one or more of a precoding matrix indicator (PMI) or a channel quality indicator (CQI) associated with the first RI for the first CC, a PMI and a CQI associated with the second RI for the first CC, a PMI and a CQI associated with the second RI for the second CC, and a PMI and a CQI associated with the first RI for the second CC.

Aspect 14: The method of any of Aspects 12 through 13, wherein the MC-DCI indicates the scheduling information for a first CC and a second CC, and wherein receiving the CSI feedback comprises: receiving a first rank indicator (RI) for the first CC, one or more of a precoding matrix indicator (PMI), a channel quality indicator (CQI), or a layer indicator (LI) associated with the first RI, a second RI for the first CC, a PMI and a CQI and an LI associated with the second RI, a third RI for the second CC, a PMI and a CQI and an LI associated with the third RI, a fourth RI for the second CC, and a PMI and a CQI and an LI associated with the fourth RI.

Aspect 15: The method of any of Aspects 12 through 14, wherein the MC-DCI indicates the scheduling information for a first CC and a second CC, and wherein receiving the CSI feedback comprises: receiving one or more of: a same rank indicator (RI) for the first CC and the second CC, a same or different precoding matrix indicator (PMI) for the first CC and the second CC, a same or different channel quality indicator (CQI) for the first CC and the second CC, and a same or different layer indicator (LI) for the first CC and the second CC.

Aspect 16: The method of any of Aspects 12 through 15, wherein the RRC configuration configures the UE to report a first rank indicator (RI), a first precoding matrix indicator (PMI), a first channel quality indicator (CQI), a second PMI, and a second CQI for a first CC, wherein the second PMI and the second CQI are based at least in part on a second RI selected for a second CC.

Aspect 17: The method of any of Aspects 12 through 16, wherein the RRC configuration configures the UE to report multiple rank indicators (RIs), precoding matrix indicators (PMIs), and channel quality indicators (CQIs) with different RIs for each CC of the multiple CCs.

Aspect 18: The method of any of Aspects 12 through 17, wherein the RRC configuration configures the UE to multiplex multiple sets of CSI reports for each CC of the multiple CCs on an uplink channel.

Aspect 19: The method of any of Aspects 12 through 18, wherein the RRC configuration configures the UE to report a same rank indicator for the multiple CCs.

Aspect 20: The method of any of Aspects 12 through 19, wherein the reception of the CSI feedback is based at least in part on one or more of: CSI reference signal resources on the multiple CCs, or a CSI reporting type for the multiple CCs being aligned.

Aspect 21: The method of any of Aspects 12 through 20, wherein the reception of the CSI feedback is based at least in part on a same CSI repot configuration type, a same report quantity, a same time restriction, or a same codebook configuration for the multiple CCs.

Aspect 22: The method of any of Aspects 12 through 21, wherein the MC-DCI is one of multiple MC-DCIs, wherein each MC-DCI of the multiple MC-DCIs is for scheduling downlink shared channels with a particular rank for co-scheduled CCs, and wherein the MC-DCIs have different fields or different bit-widths of a field based at least in part on the MC-DCIs being for different ranks.

Aspect 23: An apparatus for wireless communication at a device, comprising a processor; memory coupled with the processor; and instructions stored in the memory and executable by the processor to cause the apparatus to perform the method of one or more of Aspects 1-11.

Aspect 24: A device for wireless communication, comprising a memory and one or more processors coupled to the memory, the one or more processors configured to perform the method of one or more of Aspects 1-11.

Aspect 25: An apparatus for wireless communication, comprising at least one means for performing the method of one or more of Aspects 1-11.

Aspect 26: A non-transitory computer-readable medium storing code for wireless communication, the code comprising instructions executable by a processor to perform the method of one or more of Aspects 1-11.

Aspect 27: A non-transitory computer-readable medium storing a set of instructions for wireless communication, the set of instructions comprising one or more instructions that, when executed by one or more processors of a device, cause the device to perform the method of one or more of Aspects 1-11.

Aspect 28: An apparatus for wireless communication at a device, comprising a processor; memory coupled with the processor; and instructions stored in the memory and executable by the processor to cause the apparatus to perform the method of one or more of Aspects 12-22.

Aspect 29: A device for wireless communication, comprising a memory and one or more processors coupled to the memory, the one or more processors configured to perform the method of one or more of Aspects 12-22.

Aspect 30: An apparatus for wireless communication, comprising at least one means for performing the method of one or more of Aspects 12-22.

Aspect 31: A non-transitory computer-readable medium storing code for wireless communication, the code comprising instructions executable by a processor to perform the method of one or more of Aspects 12-22.

Aspect 32: A non-transitory computer-readable medium storing a set of instructions for wireless communication, the set of instructions comprising one or more instructions that, when executed by one or more processors of a device, cause the device to perform the method of one or more of Aspects 12-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchange-ably with "one or more." Further, as used herein, the article "the" is intended to include one or more items referenced in connection with the article "the" and may be used inter-changeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used inter-changeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design con-straints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific inte-grated circuit (ASIC), a field programmable gate array (FPGA) or other programmable logic device, discrete gate or transistor logic, discrete hardware components, or any com-bination thereof designed to perform the functions described herein. A general purpose processor may be a microproces-sor, or any conventional processor, controller, microcon-troller, or state machine. A processor also may be imple-mented as a combination of computing devices, for example, a combination of a DSP and a microprocessor, a plurality of microprocessors, one or more microprocessors in conjunc-tion with a DSP core, or any other such configuration. In some aspects, particular processes and methods may be performed by circuitry that is specific to a given function.

In one or more aspects, the functions described may be implemented in hardware, digital electronic circuitry, com-puter software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a pro-cessor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a user equipment (UE), comprising:

receiving, from a network node, a multi-cell downlink control information (MC-DCI) that indicates scheduling information for scheduling channels on a first component carrier (CC) and a second CC; and transmitting, to the network node, channel state information (CSI) feedback for a set of cells scheduled by the MC-DCI based at least in part on a radio resource control (RRC) configuration, wherein transmitting the CSI feedback comprises:

transmitting a first rank indicator (RI) for the first CC, a second RI for the second CC, one or more of a precoding matrix indicator (PMI) or a channel quality indicator (CQI) associated with the first RI for the first CC, a PMI and a CQI associated with a second RI for the first CC, a PMI and a CQI associated with the second RI for the second CC, and a PMI and a CQI associated with a first RI for the second CC.

2. The method of claim 1, wherein the MC-DCI indicates the scheduling information for the first CC and the second CC, and wherein transmitting the CSI feedback comprises:

transmitting the first rank indicator (RI) for the first CC, one or more of the precoding matrix indicator (PMI), the channel quality indicator (CQI), or a layer indicator (LI) associated with the first RI, the second RI for the first CC, a PMI and a CQI and an LI associated with the second RI, a third RI for the second CC, a PMI and a CQI and an LI associated with the third RI, a fourth RI for the second CC, and a PMI and a CQI and an LI associated with the fourth RI.

3. The method of claim 1, wherein the MC-DCI indicates the scheduling information for the first CC and the second CC, and wherein transmitting the CSI feedback comprises:

transmitting one or more of: a same rank indicator (RI) for the first CC and the second CC, a same or different precoding matrix indicator (PMI) for the first CC and the second CC, a same or different channel quality indicator (CQI) for the first CC and the second CC, and a same or different layer indicator (LI) for the first CC and the second CC.

4. The method of claim 1, wherein the RRC configuration configures the UE to report a first rank indicator (RI), a first precoding matrix indicator (PMI), a first channel quality indicator (CQI), a second PMI, and a second CQI for a first CC, wherein the second PMI and the second CQI are based at least in part on a second RI selected for a second CC.

5. The method of claim 1, wherein the RRC configuration configures the UE to report multiple rank indicators (RIs), precoding matrix indicators (PMIs), and channel quality indicators (CQIs) with different RIs for each CC of the multiple CCs.

6. The method of claim 1, wherein the RRC configuration configures the UE to multiplex multiple sets of CSI reports for each CC of the multiple CCs on an uplink channel.

7. The method of claim 1, wherein the RRC configuration configures the UE to report a same rank indicator for the multiple CCs.

8. The method of claim 1, wherein the transmission of the CSI feedback is based at least in part on one or more of: CSI reference signal resources on the multiple CCs, or a CSI reporting type for the multiple CCs being aligned.

9. The method of claim 1, wherein transmitting the CSI feedback is based at least in part on a same CSI repot configuration type, a same report quantity, a same time restriction, or a same codebook configuration for the multiple CCs.

10. The method of claim 1, wherein the MC-DCI is one of multiple MC-DCIs, wherein each MC-DCI of the multiple MC-DCIs is for scheduling downlink shared channels with a particular rank for co-scheduled CCs, and wherein the MC-DCIs have different fields or different bit-widths of a field based at least in part on the MC-DCIs being for different ranks.

11. A method of wireless communication performed by a network node, comprising:

transmitting, to a user equipment (UE), a multi-cell downlink control information (MC-DCI) that indicates scheduling information for scheduling channels on a first component carrier (CC) and a second CC; and receiving, from the UE, channel state information (CSI) feedback for a set of cells scheduled by the MC-DCI based at least in part on a radio resource control (RRC) configuration, wherein receiving the CSI feedback comprises:

receiving a first rank indicator (RI) for the first CC, a second RI for the second CC, one or more of a precoding matrix indicator (PMI) or a channel quality indicator (CQI) associated with the first RI for the first CC, a PMI and a COI associated with a second RI for the first CC, a PMI and a CQI associated with the second RI for the second CC, and a PMI and a CQI associated with a first RI for the second CC.

12. The method of claim 11, wherein the MC-DCI indicates the scheduling information for a first CC and a second CC, and wherein receiving the CSI feedback comprises:

receiving the first rank indicator (RI) for the first CC, one or more of the precoding matrix indicator (PMI), the channel quality indicator (CQI), or a layer indicator (LI) associated with the first RI, a second RI for the first CC, a PMI and a CQI and an LI associated with the second RI, a third RI for the second CC, a PMI and a CQI and an LI associated with the third RI, a fourth RI for the second CC, and a PMI and a CQI and an LI associated with the fourth RI.

13. The method of claim 11, wherein the MC-DCI indicates the scheduling information for the first CC and the second CC, and wherein receiving the CSI feedback comprises:

receiving one or more of: a same rank indicator (RI) for the first CC and the second CC, a same or different precoding matrix indicator (PMI) for the first CC and the second CC, a same or different channel quality indicator (CQI) for the first CC and the second CC, and a same or different layer indicator (LI) for the first CC and the second CC.

14. The method of claim 11, wherein the RRC configuration configures the UE to report a first rank indicator (RI), a first precoding matrix indicator (PMI), a first channel quality indicator (CQI), a second PMI, and a second CQI for a first CC, wherein the second PMI and the second CQI are based at least in part on a second RI selected for a second CC.

15. The method of claim 11, wherein the RRC configuration configures the UE to report multiple rank indicators (RIs), precoding matrix indicators (PMIs), and channel quality indicators (CQIs) with different RIs for each CC of the multiple CCs.

16. The method of claim 11, wherein the RRC configuration configures the UE to multiplex multiple sets of CSI reports for each CC of the multiple CCs on an uplink channel.

17. The method of claim 11, wherein the RRC configuration configures the UE to report a same rank indicator for the multiple CCs.

18. The method of claim 11, wherein the reception of the CSI feedback is based at least in part on one or more of: CSI reference signal resources on the multiple CCs, or a CSI reporting type for the multiple CCs being aligned.

19. The method of claim 11, wherein receiving the CSI feedback is based at least in part on a same CSI repot configuration type, a same report quantity, a same time restriction, or a same codebook configuration for the multiple CCs.

20. The method of claim 11, wherein the MC-DCI is one of multiple MC-DCIs, wherein each MC-DCI of the multiple MC-DCIs is for scheduling downlink shared channels with a particular rank for co-scheduled CCs, and wherein the MC-DCIs have different fields or different bit-widths of a field based at least in part on the MC-DCIs being for different ranks.

21. An apparatus for wireless communication at a user equipment (UE), comprising:

one or more memories; and one or more processors, coupled to the one or more memories, configured to:

receive, from a network node, a multi-cell downlink control information (MC-DCI) that indicates scheduling information for scheduling channels on a first component carrier (CC) and a second CC; and transmit, to the network node, channel state information (CSI) feedback for a set of cells scheduled by the MC-DCI based at least in part on a radio resource control (RRC) configuration, wherein the one or more processors, to transmit the CSI feedback, are configured to:

transmit a first rank indicator (RI) for the first CC, a second RI for the second CC, one or more of a precoding matrix indicator (PMI) or a channel quality indicator (CQI) associated with the first RI for the first CC, a PMI and a CQI associated with the second RI for the first CC, a PMI and a CQI associated with the second RI for the second CC, and a PMI and a CQI associated with the first RI for the second CC.

22. The apparatus of claim 21, wherein the MC-DCI indicates the scheduling information for the first CC and the second CC, and wherein the one or more processors, to transmit the CSI feedback, are configured to:

transmit the first rank indicator (RI) for the first CC, one or more of the precoding matrix indicator (PMI), the channel quality indicator (CQI), or a layer indicator (LI) associated with the first RI, a second RI for the first CC, a PMI and a CQI and an LI associated with the second RI, a third RI for the second CC, a PMI and a CQI and an LI associated with the third RI, a fourth RI for the second CC, and a PMI and a CQI and an LI associated with the fourth RI.

23. The apparatus of claim 21, wherein the MC-DCI indicates the scheduling information for the first CC and the second CC, and wherein the one or more processors, to transmit the CSI feedback, are configured to:

transmit one or more of: a same rank indicator (RI) for the first CC and the second CC, a same or different precoding matrix indicator (PMI) for the first CC and the second CC, a same or different channel quality indicator (CQI) for the first CC and the second CC, and a same or different layer indicator (LI) for the first CC and the second CC.

24. An apparatus for wireless communication at a network node, comprising:

one or more memories; and one or more processors, coupled to the one or more memories, configured to:

transmit, to a user equipment (UE), a multi-cell downlink control information (MC-DCI) that indicates scheduling information for scheduling channels on a first component carrier (CC) and a second CC; and receive, from the UE, channel state information (CSI) feedback for a set of cells scheduled by the MC-DCI based at least in part on a radio resource control (RRC) configuration, wherein the one or more processors, to receive the CSI feedback, are configured to:

receive a first rank indicator (RI) for the first CC, a second RI for the second CC, one or more of a precoding matrix indicator (PMI) or a channel quality indicator (CQI) associated with the first RI for the first CC, a PMI and a CQI associated with a second RI for the first CC, a PMI and a CQI associated with the second RI for the second CC, and a PMI and a CQI associated with the first RI for the second CC.

25. The apparatus of claim 24, wherein the MC-DCI indicates the scheduling information for the first CC and the second CC, and wherein the one or more processors, to receive the CSI feedback, are configured to:

receive the first rank indicator (RI) for the first CC, one or more of the precoding matrix indicator (PMI), the channel quality indicator (CQI), or a layer indicator (LI) associated with the first RI, the second RI for the first CC, a PMI and a CQI and an LI associated with the second RI, a third RI for the second CC, a PMI and a CQI and an LI associated with the third RI, a fourth RI for the second CC, and a PMI and a CQI and an LI associated with the fourth RI.

26. The apparatus of claim 24, wherein the MC-DCI indicates the scheduling information for the first CC and the second CC, and wherein the one or more processors, to receive the CSI feedback, are configured to:

receive one or more of: a same rank indicator (RI) for the first CC and the second CC, a same or different precoding matrix indicator (PMI) for the first CC and the second CC, a same or different channel quality indicator (CQI) for the first CC and the second CC, and a same or different layer indicator (LI) for the first CC and the second CC.

* * * * *